(12) United States Patent
Hunter

(10) Patent No.: US 8,490,520 B2
(45) Date of Patent: Jul. 23, 2013

(54) OILFIELD TUBULAR SPIN-IN AND SPIN-OUT DETECTION FOR MAKING-UP AND BREAKING-OUT TUBULAR STRINGS

(75) Inventor: Douglas A. Hunter, Calgary (CA)

(73) Assignee: Canrig Drilling Technology Ltd., Houston, TX (US)

(*) Notice: Subject to any disclaimer, the term of this patent is extended or adjusted under 35 U.S.C. 154(b) by 0 days.

(21) Appl. No.: 13/293,742

(22) Filed: Nov. 10, 2011

(65) Prior Publication Data

US 2012/0055294 A1 Mar. 8, 2012

Related U.S. Application Data

(62) Division of application No. 11/852,519, filed on Sep. 10, 2007, now Pat. No. 8,074,537.

(60) Provisional application No. 60/825,067, filed on Sep. 8, 2006.

(51) Int. Cl.
*B25B 13/54* (2006.01)

(52) U.S. Cl.
USPC .......................................... 81/57.2; 81/57.16

(58) Field of Classification Search
USPC ................. 81/57.2, 467, 57.15, 57.33, 57.19, 81/57.16, 470, 429, 469, 57.34
See application file for complete search history.

(56) References Cited

U.S. PATENT DOCUMENTS

| | | | |
|---|---|---|---|
| 3,693,727 A | 9/1972 | Bell | |
| 3,745,820 A | 7/1973 | Weiner | |
| 3,768,573 A | 10/1973 | Jennings | |
| 3,799,009 A | 3/1974 | Guier | |
| 3,881,375 A | 5/1975 | Kelly | |
| 3,882,377 A | 5/1975 | Kelly | |
| 3,961,399 A | 6/1976 | Boyadjieff | |
| 4,023,449 A | 5/1977 | Boyadjieff | |
| 4,082,017 A | 4/1978 | Eckel | |
| 4,091,451 A | 5/1978 | Weiner et al. | |
| 4,125,040 A | 11/1978 | True | |
| 4,176,436 A | 12/1979 | McCombs et al. | |
| 4,192,206 A | 3/1980 | Schulze-Beckinghausen | |
| 4,202,225 A | 5/1980 | Sheldon et al. | |
| 4,208,775 A | 6/1980 | McCombs et al. | |
| 4,210,017 A | 7/1980 | Motsinger | |

(Continued)

FOREIGN PATENT DOCUMENTS

| CA | 1014705 | 8/1977 |
|---|---|---|
| CA | 1062237 | 9/1979 |

(Continued)

OTHER PUBLICATIONS www.weatherford.com—Mechanized Rig Systems, 2004.

(Continued)

*Primary Examiner* — Hadi Shakeri
(74) *Attorney, Agent, or Firm* — Haynes and Boone, LLP

(57) ABSTRACT

Spin-in and spin-out apparatus and methods are presented wherein an oilfield tubular spinner used in combination with a wrench detects the shouldering-up of tubulars during make-up and tubular thread disengagement during break-out. Sensors are employed to quantify measurables indicative of shouldering-up and thread disengagement, the measurables being used to shutdown spin-in and spin-out operations. Thresholds are employed to detect measurable values of interest. Timers may be employed to monitor and control the spin-in and spin-out operations.

5 Claims, 7 Drawing Sheets

U.S. PATENT DOCUMENTS

| | | |
|---|---|---|
| 4,235,566 A | 11/1980 | Beeman et al. |
| 4,365,402 A | 12/1982 | McCombs et al. |
| 4,386,883 A | 6/1983 | Hogan et al. |
| 4,403,898 A | 9/1983 | Thompson |
| 4,437,363 A | 3/1984 | Haynes |
| 4,444,273 A | 4/1984 | Ruby |
| 4,444,421 A | 4/1984 | Ahistone |
| 4,470,740 A | 9/1984 | Frias |
| 4,474,520 A | 10/1984 | Buckner et al. |
| 4,475,607 A | 10/1984 | Haney |
| 4,494,899 A | 1/1985 | Hoang et al. |
| 4,495,840 A | 1/1985 | Freitag et al. |
| 4,515,045 A | 5/1985 | Gnatchenko et al. |
| 4,548,544 A | 10/1985 | Van Appledorn |
| 4,552,041 A | 11/1985 | Coyle, Sr. |
| 4,567,779 A | 2/1986 | Byrne |
| 4,567,952 A | 2/1986 | Lemaire et al. |
| 4,574,664 A | 3/1986 | Curry |
| 4,592,125 A | 6/1986 | Skene |
| 4,603,464 A | 8/1986 | Smith, Jr. et al. |
| 4,688,453 A | 8/1987 | Schulze-Beckinghausen |
| 4,696,207 A | 9/1987 | Boyadjieff |
| 4,700,787 A | 10/1987 | Buck et al. |
| 4,709,766 A | 12/1987 | Boyadjieff |
| 4,725,179 A | 2/1988 | Woolslayer et al. |
| 4,727,781 A | 3/1988 | Yuehui et al. |
| 4,730,254 A | 3/1988 | Voden, Jr. |
| 4,738,145 A | 4/1988 | Vincent et al. |
| 4,739,681 A | 4/1988 | Pietras |
| 4,765,401 A | 8/1988 | Boyadjieff |
| 4,808,064 A | 2/1989 | Bartholet |
| 4,843,945 A | 7/1989 | Dinsdale |
| 4,924,954 A | 5/1990 | Mead |
| 4,941,362 A | 7/1990 | Tambini |
| 4,981,180 A | 1/1991 | Price |
| 5,036,927 A | 8/1991 | Willis |
| 5,050,691 A | 9/1991 | Moses |
| 5,099,725 A | 3/1992 | Bouligny, Jr. et al. |
| 5,172,613 A | 12/1992 | Wesch, Jr. |
| 5,291,808 A | 3/1994 | Buck |
| 5,297,833 A | 3/1994 | Willis et al. |
| 5,402,688 A | 4/1995 | Okada et al. |
| 5,435,213 A | 7/1995 | Buck |
| 5,509,316 A | 4/1996 | Hall |
| 5,609,077 A * | 3/1997 | Ohmi et al. ................. 81/57.13 |
| 5,855,002 A | 12/1998 | Armstrong |
| 6,003,412 A | 12/1999 | Dlask et al. |
| 6,012,360 A | 1/2000 | Concha |
| RE36,631 E | 3/2000 | Tanabe et al. |
| 6,047,775 A | 4/2000 | Mock |
| 6,070,500 A | 6/2000 | Dlask et al. |
| 6,079,925 A | 6/2000 | Morgan et al. |
| 6,082,224 A | 7/2000 | McDaniels et al. |
| 6,082,225 A | 7/2000 | Richardson |
| 6,206,096 B1 | 3/2001 | Belik |
| 6,213,216 B1 | 4/2001 | Rogers |
| 6,237,445 B1 | 5/2001 | Wesch, Jr. |
| 6,263,763 B1 | 7/2001 | Feigel, Jr. et al. |
| 6,311,789 B1 | 11/2001 | Saxman |
| 6,314,411 B1 | 11/2001 | Armstrong |
| 6,374,706 B1 | 4/2002 | Newman |
| 6,385,837 B1 | 5/2002 | Murakami et al. |
| 6,505,531 B2 | 1/2003 | Stogner |
| 6,532,648 B2 | 3/2003 | Murakami et al. |
| 6,533,519 B1 | 3/2003 | Tolmon et al. |
| 6,634,259 B2 | 10/2003 | Castille |
| 6,715,569 B1 | 4/2004 | Rogers |
| 6,720,764 B2 * | 4/2004 | Relton et al. ................. 324/235 |
| 6,752,044 B2 | 6/2004 | Hawkins, III |
| 6,814,149 B2 | 11/2004 | Liess et al. |
| 6,896,055 B2 | 5/2005 | Koithan |
| 6,966,385 B2 | 11/2005 | Hemphill et al. |
| 6,971,283 B2 | 12/2005 | Belik |
| 7,000,502 B2 | 2/2006 | Belik |
| 7,028,585 B2 | 4/2006 | Pietras et al. |
| 7,036,396 B2 | 5/2006 | Moe et al. |
| 7,062,991 B1 | 6/2006 | West et al. |
| 7,100,698 B2 | 9/2006 | Kracik et al. |
| 7,117,938 B2 | 10/2006 | Hamilton et al. |
| 7,178,612 B2 | 2/2007 | Belik |
| 7,191,686 B1 | 3/2007 | Angelle et al. |
| 7,191,840 B2 | 3/2007 | Pietras et al. |
| 7,249,639 B2 * | 7/2007 | Belik ........................... 175/162 |
| 7,281,451 B2 | 10/2007 | Schulze Beckinghausen |
| 7,435,924 B2 | 10/2008 | Schmitt-Walter et al. |
| 7,455,128 B2 | 11/2008 | Belik |
| 8,074,537 B2 | 12/2011 | Hunter |
| 2001/0000832 A1 * | 5/2001 | Newman ...................... 81/57.11 |
| 2002/0189804 A1 | 12/2002 | Liess et al. |
| 2004/0051326 A1 | 3/2004 | Belik |
| 2004/0144547 A1 | 7/2004 | Koithan et al. |
| 2004/0237726 A1 | 12/2004 | Schulze Beckinghausen |
| 2005/0047884 A1 | 3/2005 | Belik |
| 2005/0076744 A1 | 4/2005 | Pietras et al. |
| 2005/0077743 A1 | 4/2005 | Pietras et al. |
| 2005/0092143 A1 | 5/2005 | Lehnert et al. |
| 2005/0096846 A1 | 5/2005 | Koithan et al. |
| 2005/0188794 A1 | 9/2005 | Schulze-Beckinghausen |
| 2006/0011350 A1 | 1/2006 | Wiggins et al. |
| 2006/0017998 A1 | 1/2006 | Fujino |
| 2006/0118335 A1 | 6/2006 | Belik |
| 2006/0179980 A1 | 8/2006 | Pietras et al. |
| 2007/0068669 A1 | 3/2007 | Lesko |
| 2007/0074606 A1 | 4/2007 | Halse |

FOREIGN PATENT DOCUMENTS

| | | |
|---|---|---|
| CA | 1164443 | 3/1984 |
| CA | 1167025 | 5/1984 |
| CA | 1185228 | 4/1985 |
| CA | 1194855 | 10/1985 |
| CA | 1195241 | 10/1985 |
| CA | 2231088 | 1/1988 |
| CA | 1250569 | 2/1989 |
| CA | 1254194 | 5/1989 |
| CA | 1257881 | 7/1989 |
| CA | 1265124 | 1/1990 |
| CA | 2018826 | 4/1991 |
| CA | 2097089 | 4/1992 |
| CA | 2048381 | 2/1993 |
| CA | 2113160 | 2/1993 |
| CA | 2113161 | 2/1993 |
| CA | 2131537 | 9/1993 |
| CA | 2134878 | 11/1993 |
| CA | 2139774 | 1/1994 |
| CA | 1327195 | 2/1994 |
| CA | 2148346 | 5/1994 |
| CA | 2115810 | 4/1995 |
| CA | 2195128 | 4/1995 |
| CA | 2224638 | 6/1999 |
| CA | 2325875 | 8/1999 |
| CA | 2260514 | 10/1999 |
| CA | 2260521 | 10/1999 |
| CA | 2306714 | 2/2000 |
| CA | 2363178 | 9/2000 |
| CA | 2389449 | 5/2001 |
| CA | 2390191 | 5/2001 |
| CA | 2397101 | 7/2001 |
| CA | 2404752 | 10/2001 |
| CA | 2195128 | 11/2001 |
| CA | 2407661 | 11/2001 |
| CA | 2476189 | 8/2003 |
| CA | 2451263 | 5/2004 |
| CA | 2535610 | 3/2005 |
| CA | 2484053 | 4/2005 |
| CA | 2545872 | 6/2005 |
| CA | 2520927 | 3/2007 |
| GB | 1470931 | 4/1977 |
| RU | 1834351 | 8/1996 |
| SU | 787624 | 12/1980 |
| SU | 940636 | 6/1982 |
| SU | 1141180 A | 2/1985 |
| SU | 1361314 A1 | 12/1987 |
| SU | 1746297 A1 | 7/1992 |
| WO | WO 00/52297 | 9/2000 |
| WO | WO 01/51764 | 7/2001 |
| WO | WO 01/79652 | 10/2001 |
| WO | WO 03/069113 | 8/2003 |

| WO | WO 2008/022424 | 2/2008 |
| WO | WO 2008/022425 | 2/2008 |
| WO | WO 2008/022427 | 2/2008 |
| WO | WO 2008/028302 | 3/2008 |
| WO | WO 2008/034262 | 3/2008 |

OTHER PUBLICATIONS

HiPer™ Control System, http://www.weatherford.com/weatherford/groups/public/documents/general/wft008924.pdf, 2005.

JAMPro™ Net, http://www.weatherford.com/weatherford/groups/public/documents/general/wft008924.pdf, 2005.

www.akerkvaerner.com—Robot Roughneck ready to Rule, Nov. 21, 2005.

www.akerkvaerner.com—Upgrade Kits for Drilling Equipment & Systems, 2006.

www.akerkvaerner.com—Drill Floor Equipment, 2006.

* cited by examiner

OILFIELD TUBULAR SPIN-IN AND SPIN-OUT DETECTION FOR MAKING-UP AND BREAKING-OUT TUBULAR STRINGS

CROSS-REFERENCE TO RELATED APPLICATIONS

This application is a divisional application of U.S. patent application Ser. No. 11/852,519, filed Sep. 10, 2007 now U.S. Pat. No. 8,074,537, now allowed, which claims priority to U.S. Provisional Application No. 60/825,067, filed Sep. 8, 2006, the contents of each of which is hereby incorporated herein by express reference thereto.

FIELD

The present invention generally relates to oilfield tubular torque wrench spinners used in make up or breakout of wellbore tubular strings and, in particular, to methods and apparatus for detecting tubular spin-in and spin-out completion.

BACKGROUND

Torque wrench tongs and spinners have been employed when making up or breaking out tubular strings and, in particular, without limiting the invention: drill pipe joints, drill collars, casing and the like in oil well drilling operations. Such tubular strings are formed by threadedly connecting the tubulars in the string. In operation of a torque wrench, a spinner is utilized to initially rotate a first tubular relative to a second tubular to thread the tubulars together. The spinner rotates the first tubular relative to the second tubular rather rapidly but at a relatively low torque and the tongs serve to finally tighten the tubulars together when making up a tubular string. Conversely, when breaking out a tubular string, the tongs initially break apart the threaded connection between tubulars with the spinner subsequently unthreading the upper most tubular from the rest of the tubular string at a relatively high speed and low torque.

SUMMARY

In accordance with a broad aspect of the present invention, there is provided an oilfield tubular spinner for an oilfield tubular torque wrench, the oilfield tubular spinner comprising: a powered spin roller including an axis of rotation; a spin motor operatively connected to, and configured to drive, the powered spin roller to rotate about its axis of rotation; and a shoulder-up system configured to detect a shoulder-up condition of a pair of tubulars being driven to threadedly connect by the powered spin roller and to initiate spin motor shutdown subsequent to the detection of the shoulder-up condition.

In accordance with another broad aspect of the present invention, there is provided a method for threadedly connecting an upper tubular and a lower tubular using an oilfield tubular spinner and a torque wrench, the method comprising: holding the lower tubular with the torque wrench; aligning the upper tubular with the lower tubular with their threaded intervals arranged for threaded connection therebetween; frictionally engaging the upper tubular with the tubular spinner; operating a hydraulic motor of the tubular spinner to rotate the upper tubular relative to the lower tubular; monitoring hydraulic fluid pressure of the hydraulic motor to detect a pressure condition of interest during rotation of the upper tubular relative to the lower tubular; and shutting down the hydraulic motor after a pressure condition of interest is detected.

In accordance with a further broad aspect of the present invention, there is provided an oilfield tubular spinner for an oilfield tubular torque wrench, the oilfield tubular spinner comprising: a powered spin roller including an axis of rotation; a spin motor operatively connected to, and configured to drive, the powered spin roller to rotate about its axis of rotation; and a spin-out detection system configured to detect a spun-out condition of an upper tubular being driven by the powered spin roller to threadedly disconnect from a lower tubular and to initiate spin motor shutdown in response to the detection of the spun-out condition.

In accordance with a further broad aspect of the present invention, there is provided a method for breaking out a threaded connection between an upper tubular and a lower tubular using an oilfield tubular spinner and a torque wrench, the method comprising: holding the lower tubular with the torque wrench; frictionally engaging the upper tubular with the tubular spinner; operating a motor of the tubular spinner to rotate the upper tubular relative to the lower tubular; monitoring a condition of the upper tubular to detect a condition of interest during rotation of the upper tubular relative to the lower tubular; and shutting down the motor after a condition of interest is detected.

It is to be understood that other aspects of the present invention will become readily apparent to those of ordinary skill in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF VARIOUS EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those of ordinary skill in the art that the present invention may be practiced without these specific details.

The present invention generally relates to tubular spinners used in making up or breaking apart oilfield tubular strings. Such strings are made up of threadedly connected tubulars such as, for example, drill pipe joints, drill collars, casing and the like in oil well drilling operations. The following description may refer to drill pipe and drill pipe joints, but it is to be understood that a torque wrench and tubular spinner may also be useful for the manipulation of other oilfield tubulars.

A tubular spinner is often used with a torque wrench, also known as an iron rough neck. Commonly, a torque wrench includes tongs that grip and rotate tubulars being handled and a tubular spinner includes rollers that frictionally engage and rotate a tubular being handled. In operation of a torque wrench and tubular spinner, the tubular spinner is utilized to initially rotate an upper drill pipe when making up the drill pipe, with the spinner rotating the pipe rapidly but at a relatively low torque and the tongs of the torque wrench serving to finally tighten the drill pipe joints when making up a tubular string. Conversely, when breaking out a tubular string, the tongs initially torque the connection to "break" it and begin the unthreading process, with the tubular spinner subsequently unthreading the upper most tubular from the rest of the tubular string at a relatively high speed and low torque.

Figure 1:
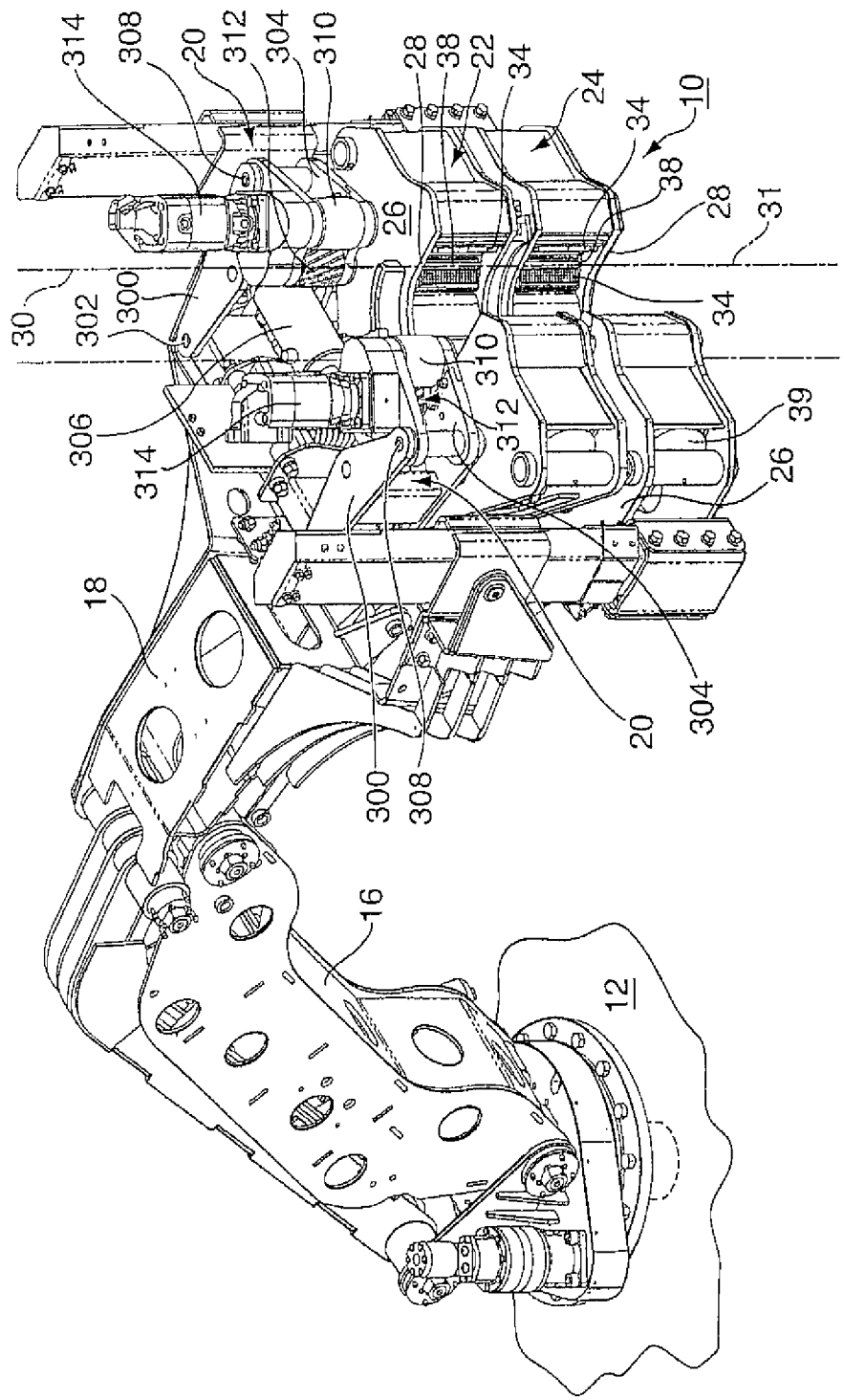
FIG. 1 is a perspective view of a torque wrench and spinner mounted on a mounting structure.
Figure 2:
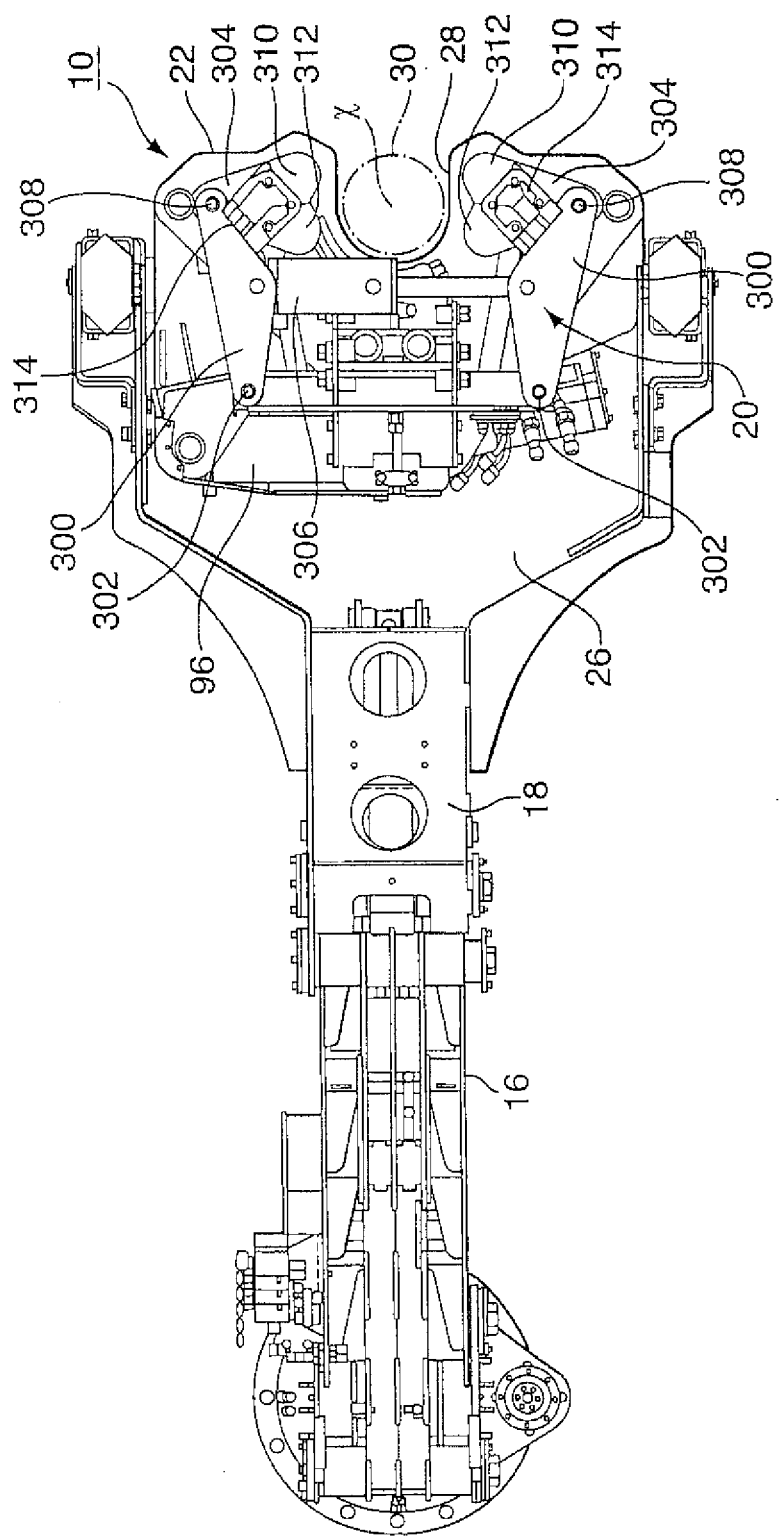
FIG. 2 is a top plan of a torque wrench and spinner according to one embodiment of the invention.
Figure 3:
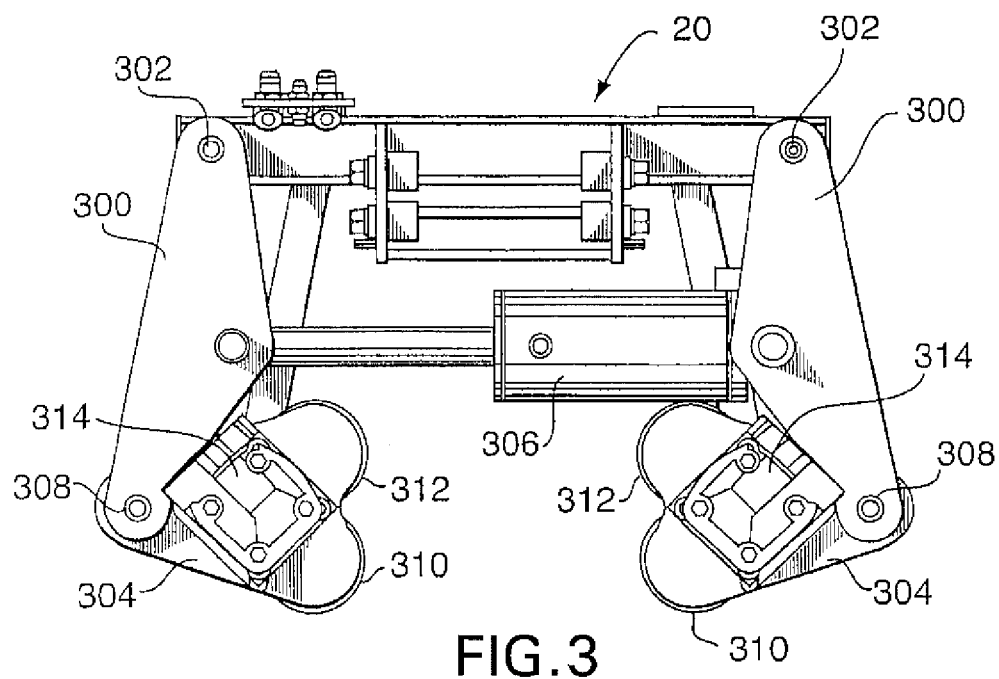
FIG. 3 is a top plan view of a spinner assembly according to one aspect of the present invention.
Figure 4:
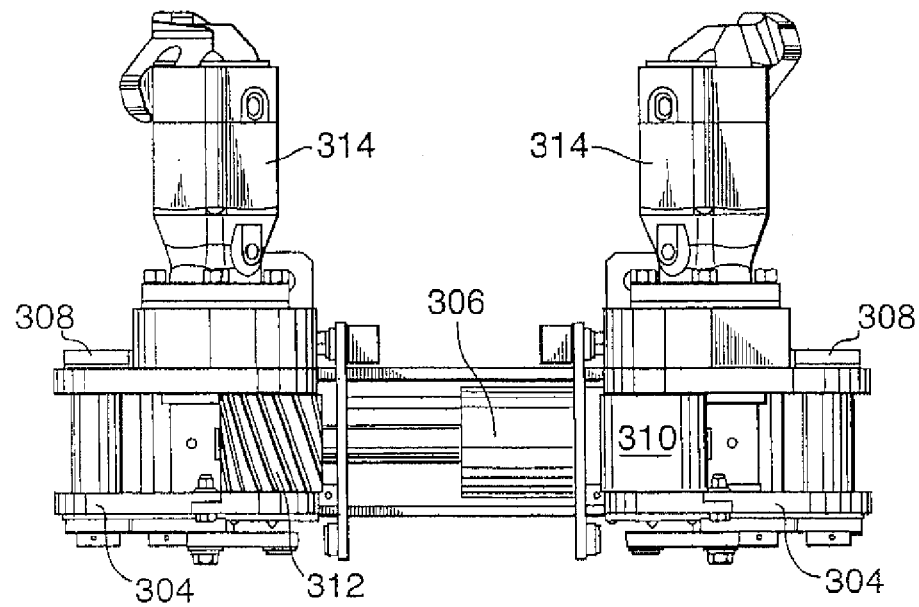
FIG. 4 is a front elevation view of the spinner assembly of FIG. 3.
Figure 5:
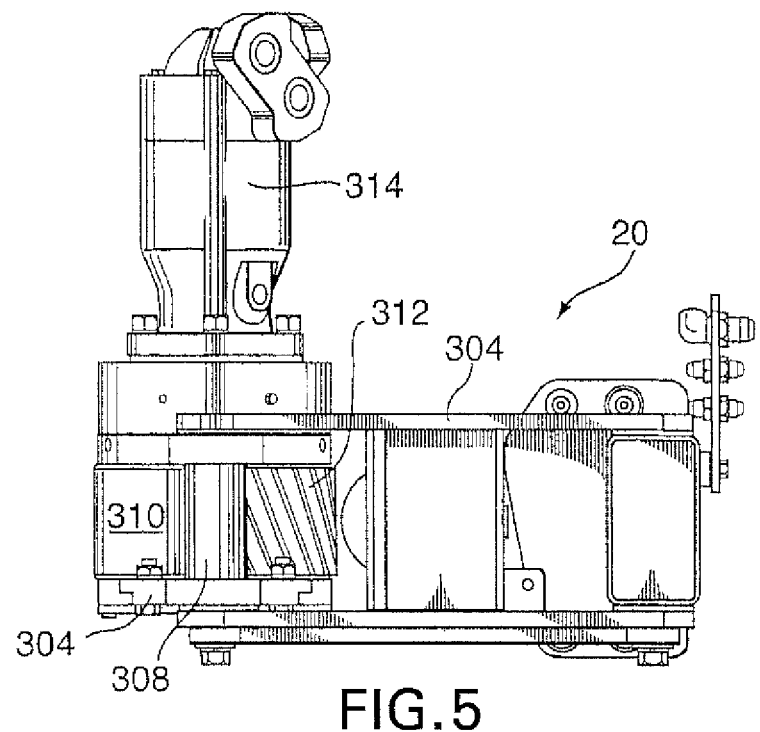
FIG. 5 is a left side elevation view of the spinner assembly of FIG. 3.
Figure 6:
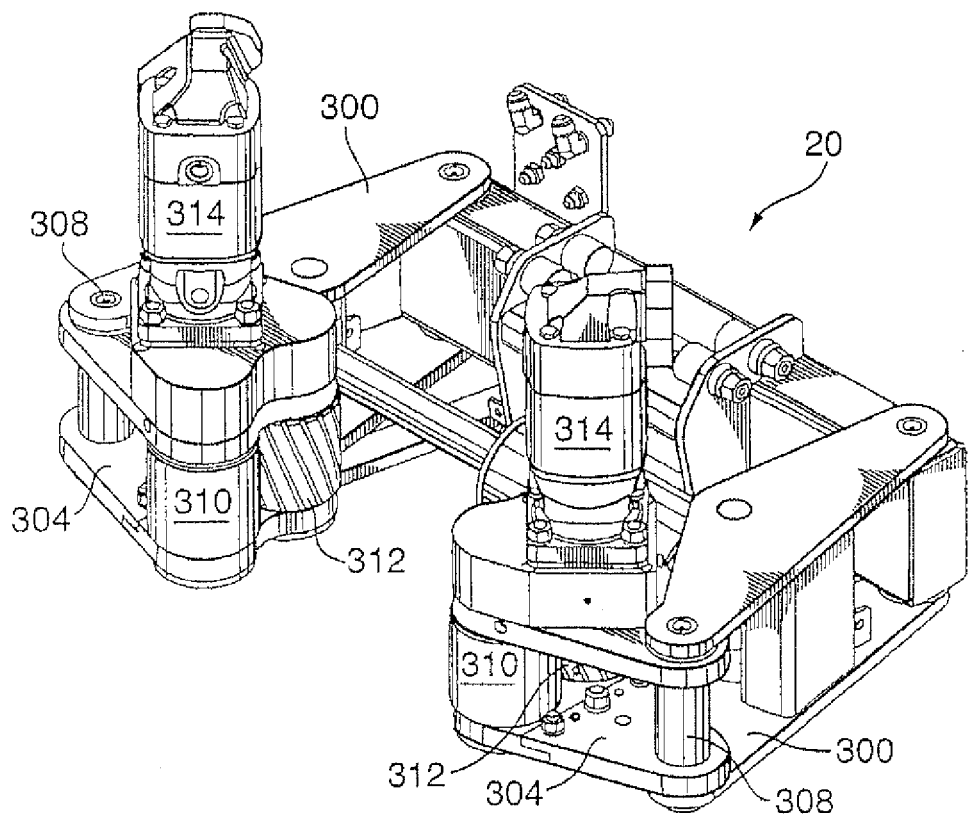
FIG. 6 is a perspective view of the spinner assembly of FIG. 3.
Figure 7:
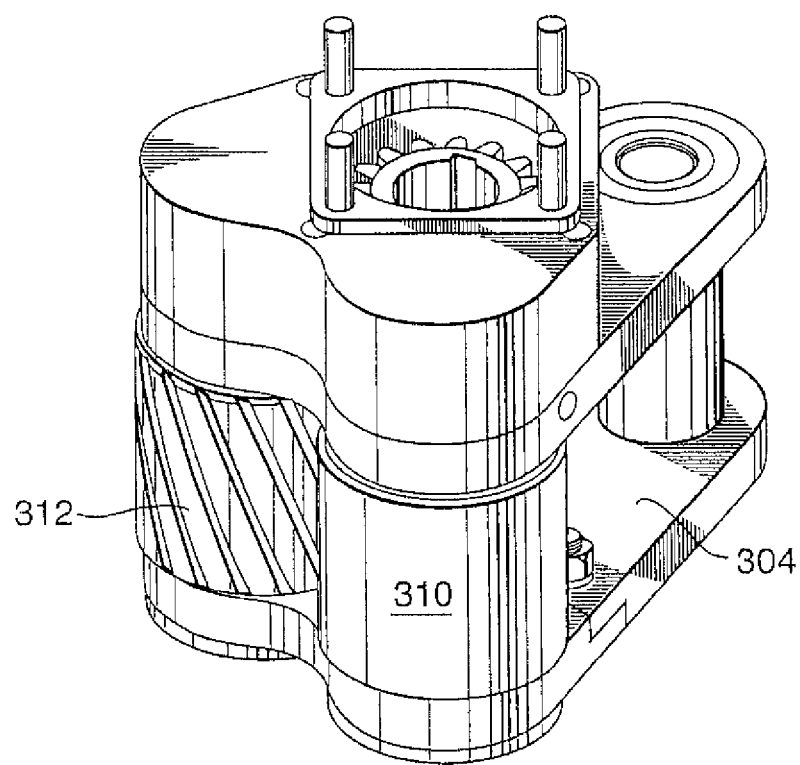
FIG. 7 is an enlarged view of a spinner roller assembly of the spinner assembly of FIG. 3.

To facilitate understanding of tubular torque wrench tongs and spinners, reference may be made to FIGS. 1 and 2 for a brief description of one embodiment thereof. One embodiment of a power actuated tubular torque wrench is generally designated by numeral 10 and illustrated in association with a drill rig floor 12, a supporting member including, in this embodiment, an arm 16 which includes a laterally extending support member 18 for the wrench. The wrench is associated with a spinner generally designated by numeral 20, which is located above the wrench for spinning tubulars. Spinner 20 in this illustrated embodiment is mounted on the wrench and supported over floor 12 by the supporting members 16, 18.

While the invention is hereafter described utilizing hydraulically actuated power cylinders and a hydraulic circuit therefor, it will be readily appreciated and understood by those of ordinary skill in the art that any one or all of the power cylinders of this invention can alternately be pneumatic and a conventional pneumatic circuit may be used in conjunction therewith. Alternately, screw drives or other drivers may be used.

Wrench 10 includes drill pipe tongs including an upper tong 22 and a lower tong 24 each of which may be substantially identical and which each include a body 26 with a generally U-shaped recess 28 in an edge thereof to receive oilfield tubulars to be handled thereby including for example joints of drill pipe, drill collars, casing, wellbore liners and the like. Recesses 28 are formed to accommodate tubulars extending generally along an axis x through the recess. Axis x is substantially vertically oriented.

In the illustrated embodiment, tubulars 30 and 31 are positioned to be acted upon by the wrench tongs and the spinner. In operation, upper tong 22 and spinner 20 generally act on an upper tubular 30 and lower tong 24 generally acts on a lower tubular 31. Considering a normal oilfield string and its manipulation by a torque wrench, tubular 30 is the upper most or last tubular and tubular 31 is the penultimate tubular of the string. The tubulars 30, 31 are shown in phantom to facilitate illustration. With the upper tong 22 gripping an upper tubular and the lower tong gripping a lower tubular, tongs 22, 24 may be swiveled relative to each other, which often includes holding one of the tongs stationary, while the other tong swivels relative thereto, to either torque up or break out a threaded connection between the tubulars.

The tongs may include various devices to permit tubulars to be gripped. For example, in one embodiment, a plurality of dies 34 having pipe gripping teeth thereon are mounted in each recess 28. In the illustrated embodiment, dies 34 are mounted on die heads 38 that are moveable, as by hydraulics 39, pneumatics, screw drives, etc., toward and away from axis x. As such, dies 34 may be moved into a gripping position or pulled back from a gripping position, as desired. The die heads may be positioned in recess 28, as shown, to act substantially diametrically opposite each other to grip a tubular therebetween.

Each die head 38 may have an angular or curved surface on which its dies 34 are mounted in spaced apart relation so that the dies are arranged along an arcuate path to generally follow the outer surface of a tubular 30 to be gripped, which is also generally acuate. The spaced, angular positioning may enable the dies 34 to engage spaced points on the circumference of the drill pipe or tool joint.

The upper tong 22 may swivel in relation to the lower tong 24 to move the tongs from a neutral position shown in FIGS. 1 to one of the make up or break out torqueing positions. To permit the swiveling action, in this embodiment, a double acting hydraulic piston and cylinder assembly 96 may be provided adjacent the end of the tong bodies 26 remote from the die heads 38 which interconnects the upper and lower tongs 22 and 24 so that by extending and retracting the torqueing piston and cylinder assembly 96 in timed relation to extension and retraction of the die heads, the upper and lower tubulars 30 and 31 may be gripped and torqued in a manner to make-up or break apart a threaded connection therebetween.

Extension and retraction of the piston and cylinder assembly 96, in this embodiment, causes the upper and lower tongs 22 and 24 to move toward and away from the torqueing position and into or through the neutral position shown in FIG. 1. That is, with the upper tong 22 either in alignment with the lower tong 24 or the upper tong 22 moved into angular position with respect to the lower tong 24, the tongs 22 and 24 are moved in a swivelling manner and after each tong respectively grips by use of dies one of a pair of tubulars positioned along axis x, the tubulars are rotated in opposite directions along axis x, for example, one in relation to the other.

When the tongs are properly aligned with oilfield tubulars 30, 31 to be handled, a threaded connection therebetween is positioned between the dies 34 of upper tong 22 and the dies of lower tong 24 with the tubulars extending generally along axis x. In that position, die heads 38 of lower tong 24 may be actuated to grip therebetween lower tubular 31. Then, depending upon whether the threaded connection is being made up or broken apart, the torque piston and cylinder assembly 96 is extended or retracted. During the extension or retraction of the torque cylinder, the die heads 38 on the upper tong 22 will be in their retracted positions so that the upper tong 22 can rotate in relation to the upper tubular 40. Thus, with the upper tong 22 released and the torque piston and cylinder assembly 96 either extended or retracted to an initial position depending upon whether the drill pipe is being made up or broken out, the upper tong 22 may then be brought into gripping engagement with the upper tubular 30 by moving the die heads out to place the dies carried thereon into gripping relation with the tubular. After this has occurred, both the upper tubular 30 and the lower tubular 31 are securely gripped by the respective tongs. Then, the piston and cylinder assembly 96 is actuated for moving the upper and lower tongs 22 and 24 pivotally in relation to each other thus torqueing the tubulars 30 and 31 either in a clockwise manner or a counter-clockwise manner depending upon whether the drill pipe is being made up or broken out.

In operation of the torque wrench, spinner 20 is utilized to quickly rotate one of the pair of tubulars being handled while the other is held against rotation by one of the tongs of the torque wrench. For example, when making up a drill string, spinner 20 is utilized to initially rotate drill pipe 30, which is the drill pipe being added to the remainder of the string, into threaded engagement with tubular 31, which is held steady. When making up the drill string, the spinner rotates the pipe to be added rather rapidly but at a relatively low torque while the upper tong 22 is disengaged and the lower tong 24 grips, for example, bites into, tubular 31 to hold it steady. The tongs 22 and 24 serve to finally tighten the threaded connection between drill pipe joints 30, 31 when making up a drill pipe string. Conversely, when breaking out a drill pipe, the tongs 22 and 24 initially torque the connection at low speed and high torque to initiate an unthreading operation of the connection with the spinner 20 subsequently frictionally engaging and unthreading the upper tubular 30 from the lower tubular 31 at a relatively high speed and low torque.

Making reference to the Figures, spinner 20 frictionally engages and rotates a tubular being handled. Thus, a tubular spinner often has an overall clamp configuration. For example in the illustrated embodiment, spinner 20 includes a pair of clamp arms 300, pivotally connected by pivot pins 302 to a frame for clamping about a tubular to be added to the tubular string during make up, or about the upper most tubular, which is that tubular to be removed from the tubular string, during break out. Of course, the invention is not limited to a clamp shaped spinner; a variety of other spinner configurations may be used.

Engagement between spinner clamp arms 300 and the tubular to be spun is through spinner rollers 310 and 312. Spinner rollers 310, 312 rotate about an axis of rotation substantially parallel to axis x. Without limiting the invention, the spinner rollers include one or more powered rollers 312 and, optionally, idler rollers 310. While FIGS. 1 to 6 show paired powered rollers 312 and idlers 310, the invention is not limited thereto. For example, any number of powered rollers may be used. In one embodiment, for example, four powered rollers are used without any idlers.

The implementation shown in the Figures includes a powered roller 312 and an idler 310 on each clamp arm 300. In the illustrated embodiment, the rollers are mounted on a clamp arm extension 304, which has some provision for pivotal movement relative to its clamp arm 300, as through pivot pin 308. In accordance with the implementation, the rollers 312 and idlers 310 are moved from a neutral position towards axis x to a spinning position for engaging tubular 30 via clamping action of the clamp arms 300. Clamp arms 300 may be driven, for example, by a hydraulic or pneumatic cylinder 306 to open or close relative to axis x. The pivotal movement of clamp arm extensions 304 may allow the rollers 312 and idlers 310 to engage and accommodate tubulars of various different diameters and to provide for a variance in grip pressure and positioning the spinner 20 about a tubular 30. Each extension 304 may be limited in its pivotal motion relative to its arm to prevent the extension from moving out of a useful position during operation. Alternately or in addition, the two extensions 304 may be connected by a linkage to maintain their relative alignment during movement of clamp arms 300 between the neutral and the spinning positions.

Powered rollers 312 are formed to frictionally engage a tubular to be handled. In one embodiment, rollers 312 are formed of durable materials such as steel. Rollers 312 may include surface treatments such as spiral grooving, roughening, etc. to enhance engagement of the tubular. During spin-in and spin-out, spinning motion is imparted to the tubular 30 via rollers 312 as powered by motors 314. In particular, motors 314 drive rollers 312 to rotate about their axis of rotation and in turn rollers engage and drive rotation of the tubular. In accordance with a paired spin drive implementation, such as shown in FIGS. 1 to 6, or in a multiple spin drive implementation (not shown), each powered spin roller 312 imparts spinning torque to the tubular 30, the spinning torque necessary to spin tubular 30 about axis x being divided over the multiple motors 314 and rollers 312 associated therewith reducing individual load and tear thereon. In one embodiment, motor redundancy is provided should one of the motors 312 fail.

Figure 8:
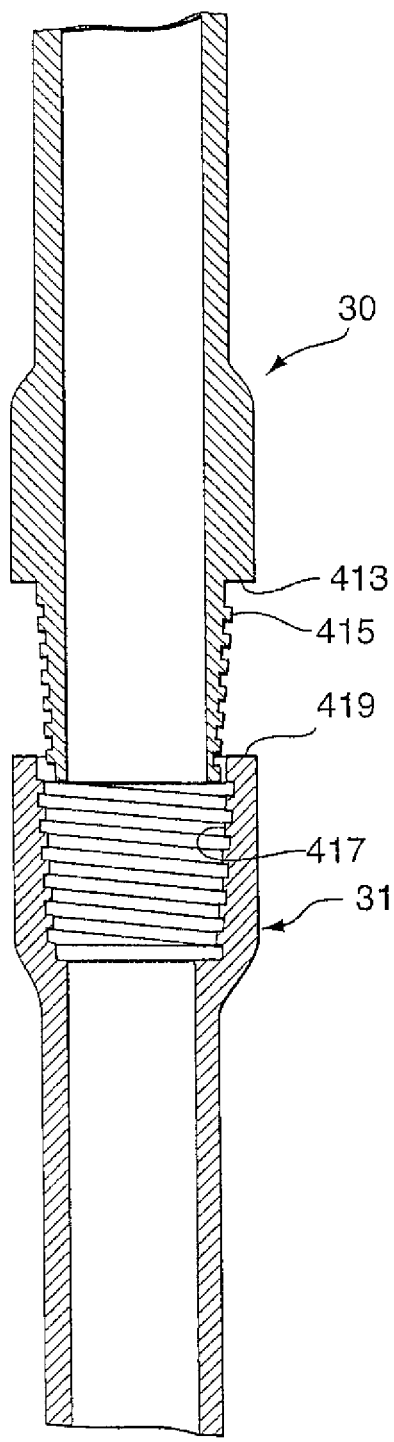
FIG. 8 is a schematic sectional view of a typical threaded connection between drill pipe.

It could be said that tubular connection make-up may be divided into three steps: spin-in, shouldering up, and tightening, and conversely that the tubular connection break-out may be divided into loosening and spin-out. Shouldering up is achieved when the entire tapered thread of a pin end of the tubular being added to a tubular string is inserted in the box end of the last tubular of the tubular string. With reference to FIG. 8, in some embodiments, the tubulars each include at one end a shoulder 413 adjacent the base of their pin threaded intervals 415 and at their opposite ends a threaded box end 417. The tubulars are formed such that the pin threaded interval 415 threads into the box end 417 of a next tubular. Shouldering up is achieved when an end face 419 of the box end butts against shoulder 413 of the pin end being threaded into the box. It will be appreciated that the illustration of FIG. 8 represents a standard oilfield drill pipe connection. Often, many hundreds of identical type tubulars are used in series to form an oilfield string. Thus, during string handling the same connection type will be acted upon repeatedly by the torque wrench.

The tightening and loosening of tubular connections may be performed as described hereinabove using tongs 22 and 24 of the torque wrench, wherein relatively high torques are imparted to tubulars at relatively low rotational speeds. In contrast, the spin-in and spin-out steps are desirably performed at comparatively high rotational speeds by the spinner 20 while employing comparatively much reduced torque. Relatively high spin-in and spin-out speeds are desired as tubular strings include large numbers of tubulars and as the minimization of make-up and break-out time overheads is desired.

It is desirable that the process of spinning-in a tubular be rapid to reduce the overall time for drill string handling. A person of ordinary skill in the art would appreciate that high-speed spin-in imparts a large angular momentum to the tubular 30. If the spinner roller(s) 312 slip while being driven, the tubular being handled may be marred and both the tubular and the spinner rollers may potentially be damaged. Thus, roller slipping should be avoided as much as possible.

Other variables require consideration when spinning-in and shouldering-up tubular 30. The thread on the pin end of tubular 30 is tapered, as is the thread on the box end of tubular 31. The same tubulars 30 and 31 are used and reused in making-up and breaking-out a number of tubular strings, which may result in cumulative wear of the tapered threads. As it may be appreciated, doping may be used to grease the threads. The pipe dope has different viscosity under different environmental conditions (i.e. temperature, humidity, etc) and depending on the type of pipe dope being used.

Figure 9:
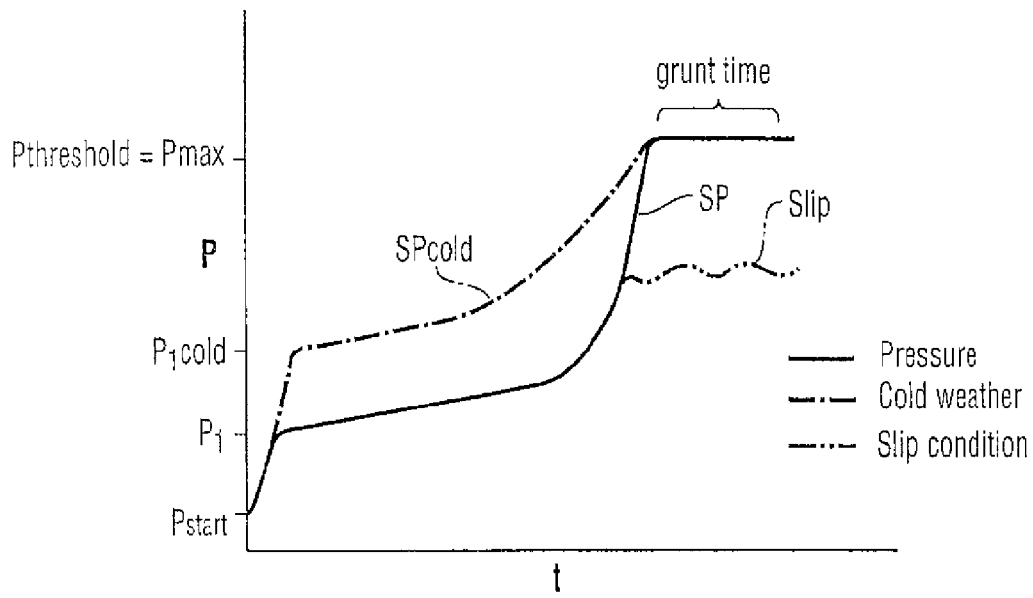
FIG. 9 is a graphical illustration of typical hydraulic system pressure vs. time during operation of a tubular spinner.

With reference to FIG. 9, in a tubular spinner applied torque substantially corresponds to the fluid pressure of the hydraulic system driving motors 314. Since system pressure may be monitored by a pressure transducer and/or other means, the applied torque may conveniently be monitored and understood by observing the hydraulic system pressure response. During a spin in operation hydraulic system pressure is originally at a starting level Pstart. When the driven rollers 312 are brought into contact with a tubular and motors 314 are started up to drive rollers 312, the system pressure quickly jumps to an initial operating pressure P1 and then gradually increases as the tubulars are threaded together. When the threaded intervals of the pin end and box approach a shouldering condition, the force required to continue the threading operation generally increases abruptly. As such, during this portion of the spin-in operation, system pressure also can be seen to increase abruptly, as shown in the region SP. When the tubulars shoulder up, the system pressure plateaus at a maximum pressure level Pmax. In cold weather operation of the same system, the system pressure will initially jump to a higher initial operating level P1cold, primarily due to increased viscosity in hydraulic system fluids and doping. However, the system pressure will gradually increase before undergoing an abrupt increase SPcold to eventually level off at maximum pressure when the tubulars being spun-in shoulder up. Maximum pressure during a cold operation may generally be substantially similar to the maximum pressure Pmax reached using that same system during warmer operating conditions. Cold weather operation may create a more linear increase over time from the initial operating pressure to a maximum pressure, wherein the pressure increase is less abrupt prior to shouldering up.

The maximum pressure Pmax of the tubular spinner hydraulic system can be determined such that an operator can establish a pressure threshold, Pthreshold, for the system. Pthreshold is substantially equal to Pmax. The operator can then actively or automatically control the system based on the pressure threshold established for the system. In particular, since the pressure threshold offers an indication of a shouldered up condition, an operator can monitor system pressure and use the established Pthreshold value to indicate a shouldered up condition. Pmax, and therefore the pressure threshold, may vary depending on the profile of the tubulars being handled, for example, thread type, tool joint design, etc. However, Pmax, and therefore Pthreshold, can be determined and recorded for a tubular spinner and for any of the various tubulars to be handled, such that during operation measured pressure can be compared against expected pressure conditions, such as the pressure threshold. In addition, since tubular strings often include many hundreds of similar connection types to be handled in direct succession, any established pressure conditions of interest can be used repeatedly and systems can be set up based thereon.

Figure 10:
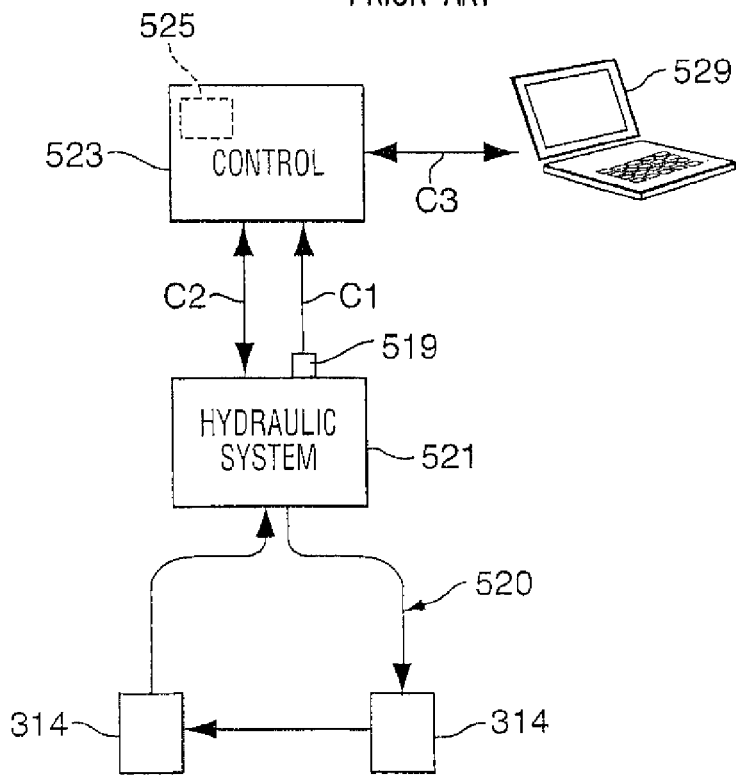
FIG. 10 is a chart of a system according to the present invention.

With reference to FIG. 10, in order to control operation of a tubular spinner, in one embodiment, a pressure transducer 519 or other component for measuring hydraulic system pressure, may be positioned in communication with the hydraulic drive system 520 for motors 314, for example in or adjacent the pumping system 521, and a control system 523 may be provided in monitoring communication C1 with pressure transducer 519 and in control and monitoring communication C2 with pumping system 521. Pressure transducer 519 and control system 523 may be used to monitor operational hydraulic system pressure of the tubular spinner. In one embodiment, for example, control system has stored thereto a value for Pthreshold and the pressure transducer and control system monitor for Pthreshold in order to determine when shouldering up has been accomplished and, therefore, when the motors may be shut down. For example, in one embodiment, the control system may operate to shut the hydraulic system down when Pthreshold is reached, as sensed by pressure transducer 519. Alternately, in another embodiment, the control system may activate or initiate other systems or steps when Pthreshold is sensed, as discussed below.

A control system that monitors the roller motor's hydraulic system pressure may be useful in systems to prevent roller slipping. For example, rollers can slip when the tubular that they are rotating shoulders up and can no longer be rotated. Thus, recalling that Pthreshold indicates that a tubular has shouldered up, it will be appreciated that shutting down the roller drive motors when Pthreshold is reached may prevent roller slipping.

However, additionally or alternatively, further slip prevention options may be employed. For example, in one embodiment, hydraulic system pressure may be monitored to detect a slip condition occurring prior to shouldering up. If the rollers begin to slip on the tubular, the hydraulic system pressure for the spinner may cease to increase and may begin to fluctuate about a level lower than Pthreshold. If, for example with reference to FIGS. 9 and 10, the pressure sensed at pressure transducer 519, as monitored by control system 523, levels off at a pressure, shown by the line identified as SLIP, that is less than Pthreshold, the control system 523 may shut down the hydraulic system to thereby shut down motors 314. Control system 523 may include or communicate with a timer 525 for timing the various system functions such as motor operation and/or for monitoring the duration of pressure plateaus. If desired, control system 523 may include a communication C3 to an operator interface 529. In a situation where slippage has been detected, as by detecting a plateaued pressure below Pthreshold substantially maintained for a selected period of time, control system 523 may shut down pumping system 521 to shut the motors down and/or may generate an error message at the operator interface to notify the operator that a slippage problem has occurred and/or that the tubular spinner has been shut down.

In another embodiment, a shoulder-up time limit can be established for any particular type of tubular connection to be handled by a tubular spinner. The time required to spin-in and shoulder up a tubular connection will be effected by the number of threads, flow rate of the hydraulic system, etc. and can be determined by testing. If the rollers begin to slip, the threading in operation may be delayed or never be completed such that the connection does not shoulder in the expected connection time. In such an embodiment, a timer, such as timer 525 can be used to monitor the length of time from system start, when the motors begin to drive rollers 312 to spin the tubular, until a shoulder up condition is detected, for example, when Pthreshold is reached. If through timer 525 and pressure sensing, as by use of transducer 519, it is determined that Pthreshold has not been reached in an expected time frame, the system may determine that a problem has occurred and shut down the motors. Again, an error message may be sent to an operator interface 529.

In accordance with an implementation of the invention, the pressure sensing and control systems may employ high-speed sense and communication electronics to effectively monitor and analyze the system pressure during operation.

As noted above, after a shouldering-up, the motors may be shut down. However, in accordance with another embodiment of the invention, after shouldering-up, the tubular spinner may be permitted to operate for an additional period to apply additional torque to the connection being made up. This additional time may be termed a "grunt" time, as shown in FIG. 9. For example, a "grunt" timer may be employed to run the spinner motors 314 for a controlled period of time at high torque, to squeeze out the pipe dope. Thus, when Pthreshold is detected, indicating shouldering up, the hydraulic pressure can be maintained to drive the driven rollers 312 for a selected additional period, at the expiration of which the spin-in operation is shut down. A control system and a timer, such as, for example, control system 523 and timer 525, may be employed to control the grunt time. The time period to which the timer may be set initially is dependent on environmental conditions and varies with doping viscosity, but may be selected readily by observation of the tubular spinner operation.

The spin-out operation is started subsequent to the loosening of a connection between tubulars 30 and 31. The spin rollers 312 may be used to unthread enough of the tubular threads to allow disengagement of the tubulars 30 and 31. However, as soon as the pin and box threads disengage, the last thread of the upper tubular 30 drops down on the first thread of the lower tubular 31, called jumping. If the upper tubular 30 continues to be rotated after it is disengaged from the lower tubular 31 the last thread will repeatedly ride up the first thread of the lower tubular and drop down. During jumping, the threads may be damaged to a lesser or greater extent by the impact therebetween. Thus, it may be useful to know when tubular 30 has been spun-out and the threads have disengaged, to allow removal of the upper tubular 30 before it ever or repeatedly drops down on the tubular below it. On the other hand, attempting to remove tubular 30 prior to thread disengagement may result in the tubulars 30 and 31 snagging and may possibly cause thread damage.

In accordance with another embodiment of the invention, the tubular spinner may include a spin-out detection system to identify when a pair of tubulars has been fully or nearly spun-out so that the motors driving the rollers of the tubular spinner can be shut down. In one embodiment, for example, a system may be employed to monitor the number of tubular revolutions (angular displacement) that the tubular undergoes during a spin-out operation and this can be compared against a known number of tubular revolutions required to disengage the threads of the tubualars being handled. For many oilfield tubulars, it may take between 2 to 21 turns of one tubular relative to the other to disengage the threads. Depending on the tubular type being employed it may only require 3 to 4 turns to disengage the threads, but in some situations it may take between 10 to 20 turns to disengage the threads. The number of turns required to disengage a pair of tubulars, is readily determinable and may already be publicly known for some tubular types. In such a system, an encoder may be employed to count the number of tubular revolutions being driven by the tubular spinner.

In accordance with an implementation of this embodiment of the invention, an encoder may be employed to sense number of turns of a component of the tubular spinner, such as the motor 314, or rollers 310, 312, for example rotations of the motor shaft, motor gears, roller shaft, etc. This count can be used to determine the number of times the tubular 30 is rotated about its axis. As will be appreciated, such a correlation may be made based on the diameter of the roller and the diameter of the pipe being rotated. During operation, an operator may input a pipe diameter being handled to a control system such that the tubular spinner may be automatically controlled to stop after the selected number of tubular rotations for that pipe diameter. If desired, a detector may be employed on the tubular spinner, for example, to detect the space between the rollers to automatically determine the pipe diameter of the pipe being handled and therefore, the ratio of a roller rotation to a pipe rotation.

It is to be noted, however, that in practice the spin-out operation may start with the driven rollers 312 skipping over the surface of the tubular being handled which does not preserve the ratio of motor 314 revolutions to tubular 30 revolutions thus introducing errors in the counting of the turns; the discrepancy being non-determinable. Also, if the tubular 30 being unthreaded is not clean, this may also introduce problems in sensing/measuring tubular rotation. These possible errors must be considered in the use of a tubular rotation count to detect a spun-out condition.

In accordance with another implementation of the embodiment of the invention, an accelerometer may be employed to detect acceleration or jerk (changes in acceleration) during thread jumps. An accelerometer may be employed with high-speed feedback electronics to monitor the accelerometer output. The accelerometer may be installed adjacent the tubular being handled, such as a portion of the spinner frame for example on arm 300 or extensions 304 to monitor vertical tubular accelerations and, in particular, the G forces generated by the tubular. The accelerometer may generate a signal for handling by a control system, for example to alert an operator or for processing for automated operation. In the high vibration environment of well bore drilling; the accelerometer may be affected by false triggering. Also, at least one thread jump must be incurred for the accelerometer to trigger and a thread jump occurs in such a short period that normal electronic monitoring rates sometimes can miss one or more thread jump events.

In accordance with a further implementation of the embodiment of the invention, a linear transducer may be employed to detect linear separation between the upper and lower tubulars 30 and 31, reverse linear displacement in the separation indicating thread jump. The linear transducer may be installed on a stationary structure, such as a portion of the spinner or torque wrench frame, adjacent the tubular being handled. The linear transducer may be installed between a stationary point and the tubular or the rollers, which tend to move vertically with the tubular, to monitor vertical displacements of the tubular vs. time. Again, with the thread jump being very sudden and occurring during a short duration of time, a highly sensitive linear transducer and high-speed feedback electronics may be employed to read the linear transducer output and feed that to a control system. In the high vibration environment of well bore drilling; the linear transducer may be affected by false triggering. Also, at least one thread jump must be incurred for the linear transducer to trigger.

In accordance with yet another implementation of the embodiment of the invention, a spin-out timer may be employed based on spinner motor 314 operations to spin-out the tubular 30 before reassessing tubular disengagement. The spin-out timer, which may for example be a timer component 525 of a control system 523, is started as the spin-out operation is started (i.e, when the motors start rotating) and given tubular parameters such as, but not limited to: the thread taper, thread pitch and spin-out speed, may typically be set at 3 to 5 sec roughly corresponding to 3 to 4 revolutions of the tubular 30. After the allocated spin-out time elapses, as monitored by the timer, the motors are shut down to stop the spin-out process. If the tubulars 30 and 31 have not disengaged within the period allowed by the timer, tubular 30 may be spun again for another, possibly shorter, period of time. An established time for disconnection for any particular tubular connection type in any particular tubular spinner may be stored to control system and the breaking out process can be controlled by the control system employing its timer component.

In the above it is understood that employing various of these systems, may require a comparator for comparing measured values to the established values of interest. It is further understood that employing a values of interest may require the storage of the values, possibly in memory storage. This is true for example in some systems employing pressure thresholds, system pressures, operational times, etc.

It is understood that the various aspects of the invention and that various elements of the implementation described may be employed alone, severally and in various combinations to improve spin-in and spin-out detection in making-up and breaking-out tubular strings, without limiting the invention.

The previous description of the disclosed embodiments is provided to enable any person of ordinary skill in the art to make or use the present invention. Various modifications to those embodiments will be readily apparent to those of ordinary skill in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

What is claimed is:

1. An oilfield tubular spinner for an oilfield tubular wrench, the oilfield tubular spinner comprising:
    a powered spin roller including an axis of rotation;
    a spin motor operatively connected to, and configured to drive, the powered spin roller to rotate about its axis of rotation; and
    a spin-out detection system configured to detect a spun-out condition of an upper tubular being driven by the powered spin roller to threadedly disconnect from a lower tubular and to initiate spin motor shutdown in response to the detection of the spun-out condition, wherein the spin-out detection system includes:
        a sensor to identify a downward vertical displacement of the upper tubular during handling by the spinner, such downward vertical displacement indicative of a thread jump, wherein the sensor is selected from the group consisting of: an accelerometer or a linear transducer;
        a timer to monitor the operational time that the powered spin roller is driven by the motor;
        an encoder to at least indirectly count the number of rotations through which the upper tubular has moved during operation of the spin motor;
        a memory storage configured to store spin-out or disengagement times, or both, for particular tubular type profiles to be handled; and
        a controller configured to continuously monitor the linear displacement between the upper and lower tubulars, acceleration of the tubulars, or both.

2. The oilfield tubular spinner of claim 1, wherein the controller issues an alert when there is a thread jump.

3. The oilfield tubular spinner of claim 1, wherein the controller further continuously monitors the angular displacement of the upper and lower tubulars.

4. The oilfield tubular spinner of claim 1, further comprising tongs operationally associated with the spinner, wherein the tongs are configured to rotate a tubular at low speed and high torque to begin an unthreading operation.

5. The oilfield tubular spinner of claim 1, wherein the powered spin roller is configured to accommodate a plurality of oilfield tubulars collectively having a range of diameters.

* * * * *